Sept. 4, 1945. W. S. PILCHER 2,383,989
APPARATUS FOR MANUFACTURING EXPLOSIVE
Filed Aug. 12, 1943 3 Sheets-Sheet 1

*William Stanton Pilcher* INVENTOR.

BY *Thos. A. Wilson*
ATTORNEY

William Stanton Pilcher INVENTOR.

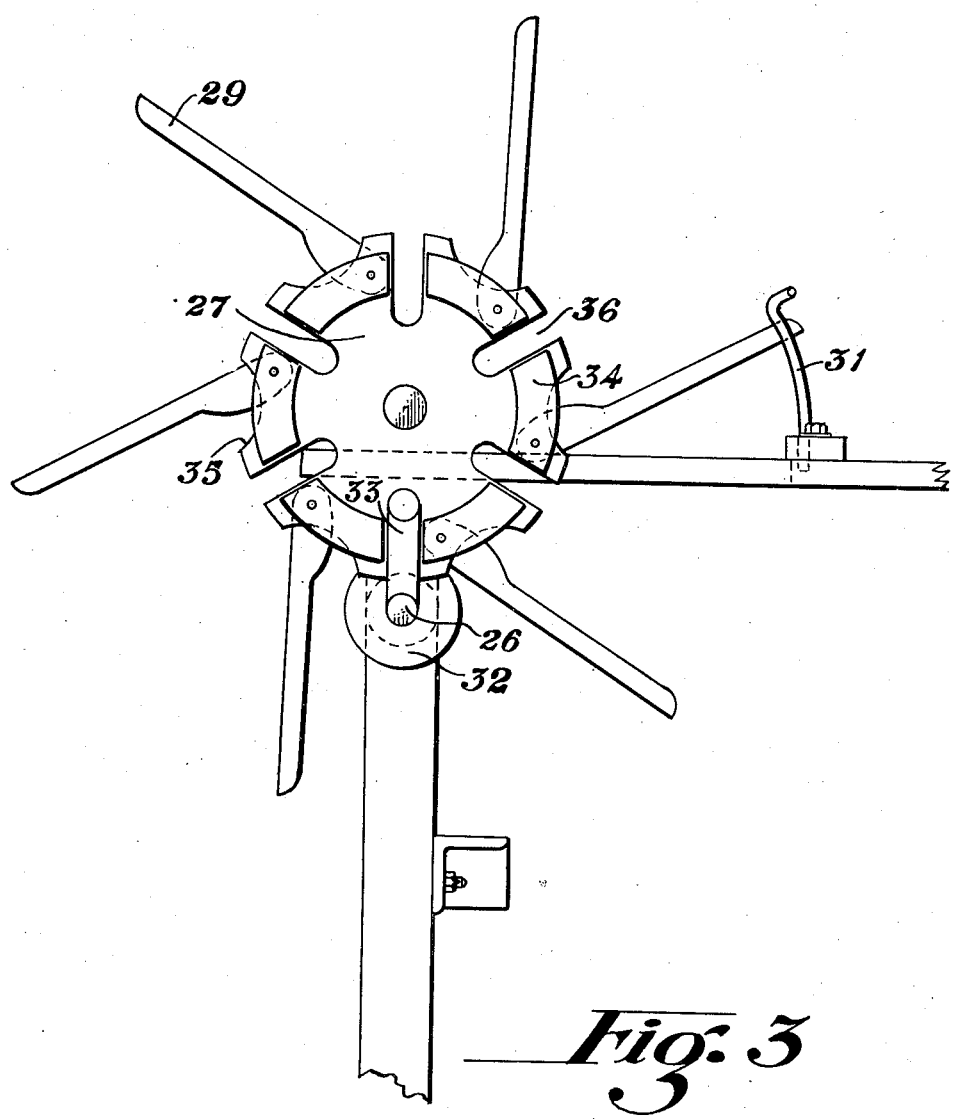

Patented Sept. 4, 1945

2,383,989

UNITED STATES PATENT OFFICE 2,383,989

APPARATUS FOR MANUFACTURING EXPLOSIVES

William S. Pilcher, Woodbury, N. J., assignor to E. I. du Pont de Nemours & Company, Wilmington, Del., a corporation of Delaware Application August 12, 1943, Serial No. 498,378

11 Claims. (Cl. 18—4)

This invention relates to an apparatus for forming plastic materials, and more particularly to an apparatus for cutting extruded plastic or gelatinous explosives into pieces of predetermined length irrespective of variations in the rate of extrusion.

Machines for cutting explosives are well known in the art. While they have certain elements of value and are capable in some degree of successful operation, they nevertheless possess undesirable features and are somewhat limited in application. In all of the known devices in this art, the cutting means fails to operate in synchronism with the extruding means. Furthermore, these means are incapable of being set to operate synchronously; that is, the cutter is not capable of being set so that it will adjust its movement to the changing rate of extrusion. This results in sticks of various lengths or loss of time in reworking scrap material, either of which is undesirable.

An object of the present invention is to provide an apparatus for forming plastic materials into predetermined dimensions. A further object is an apparatus for cutting extrudable explosives into predetermined length irrespective of changes in the rate of extrusion. A still further object is an apparatus whereby plastic materials, especially gelatinous or plastic explosives, may be cut, as they are continuously projected from an extruding machine, into segments of a predetermined length irrespective of variations in the rate of extrusion and without loss of time or material, said cutting means being mechanically actuated in synchronism with said extruding means. Other objects will be apparent from the description hereinafter given.

Stated generally, the above objects are accomplished according to the present invention by the discovery of a novel apparatus comprising, in combination, a cutting and wrapping device including a set of rollers for paper hereinafter referred to as paper rollers; means for producing the desired traction and arc of contact of the paper on said rollers; a measuring device on one of the rollers; means for actuating the rollers; a cutter comprising a wheel with spoke-like cutting elements; a shaft concentrically journaled in the cutter; an extruding machine; a table or similar article adapted to receive the paper and extruded material simultaneously, said table having an opening therein to allow the cutter elements to pass therethrough, said machine being fixed in relation to the table to permit the plastic material to be extruded onto the paper thereon, thereby causing the extruded material to slide the paper therewith across the table at the rate of extrusion; means for causing one of the cutting elements to sever the extruded material and paper when they have been projected across the table a predetermined distance; a wrapping device at the opposite end of the table and a conveyor system for carrying the extruded material from the cutter through and away from the wrapping device.

More specifically, the invention provided in accordance with a preferred embodiment of the present invention comprises, in combination, a cutting device comprising a plurality of paper rollers including a supply roll, metering roller, feed or drive roller and a guide roller; at least one suitable tightening device adapted to produce the desired traction and arc of contact of the paper on said rollers; a measuring device on one of the rollers including a peripheral cam, a cam roll having a follower attached thereto and being held against the circumference of the cam by means of a tie rod pivotally attached to the follower and connecting the measuring device with a single revolution clutch comprising a peripheral cam, a follower pivotally attached to the opposite end of said tie rod and held against the circumference of said cam by means of a spring or any suitable resilient article secured to said follower; a rotatable shaft concentrically journaled in the clutch; a cutter embodying the Geneva movement and including a rimless wheel with spoke-like blades attached thereto, said blades being free at their opposite ends, a follower with a series of grooves therein adapted to receive the driver of said wheel, the driver having at least one tooth thereon, a series of slots alternately arranged between the grooves adapted to receive the driver tooth, said driver and tooth being adapted to alternately engage the grooves and slots to alternately lock and rotate the cutter wheel; a shaft concentrically journaled in the cutter wheel, the shaft of said clutch being concentrically journaled in the cutter wheel driver; an extruding machine; a shelf or table adapted to receive the paper and extruded material simultaneonsly and having an opening therein to allow said blades to pass therethrough; a wrapping device at the opposite end of the shelf; and a conveyor including a belt for conveying the extruded material from the cutter through and away from the wrapping device, said conveyor being actuated by a belt drive by means of a worm gear train keyed to the head drive shaft, said drive roller being actuated by a belt drive from the conveyor, the remainder of the paper rollers being driven by the drive roller, said cutter being actuated by the head drive shaft through a series of belt drives connecting said shaft with the single revolution clutch. The function of these parts to form predetermined length segments of the extruded material will be described more fully now with reference to the drawings.

The term wheel or cutter wheel as hereinafter used is intended to designate preferably a rimless wheel, that is a structure including a plurality of cutter elements suitably arranged in and extending from a hub or common center; however, it may also include a wheel in the ordinary sense of that term.

The embodiments hereinafter shown are merely examples of ways in which the invention may be carried out, and it is to be understood that these may be varied widely within the scope of the invention.

Figure 3 is a detailed side view, looking from the left, of the cutter wheel arrangement having a different type of cutter elements than shown in Figure 2.

Figure 1:
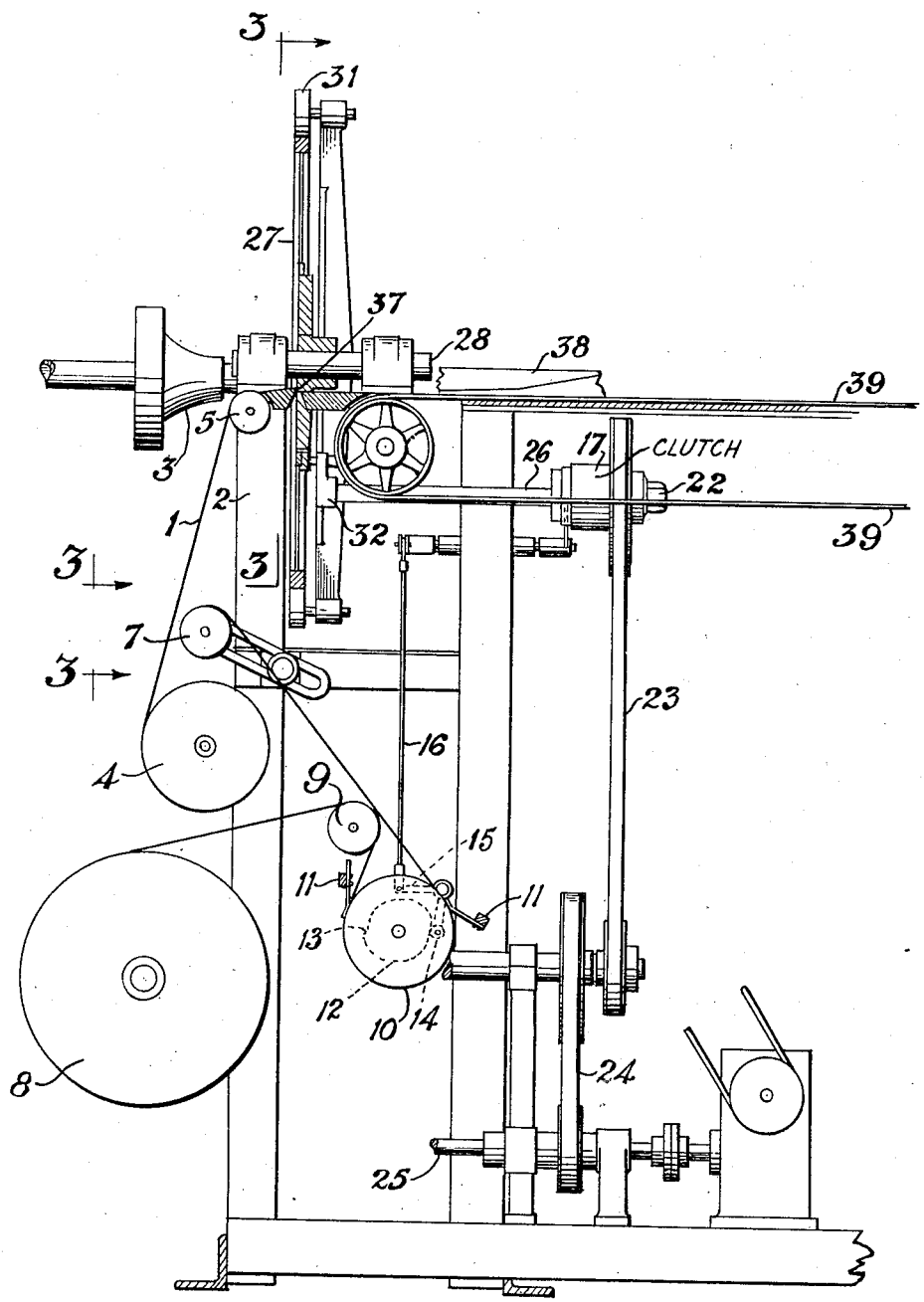
Figure 1 is an elevation view of the assembled machine with some portions cut away.

Referring in greater detail to the drawings wherein like reference characters denote similar and like parts, the sheet of paper 1 represented by the broken line is carried across the shelf 2 by the extruded material, hereinafter referred to as the cake or cakes, as it is projected from the nozzle 3 of the extruding machine. In order to increase the friction between the cake and paper so that they will travel together only, the nozzle is located so that as the cake is projected therefrom its lower surface is below the top surface of the shelf.

Since the cake may be relatively soft and deformable, it is important that the tension in the paper between the drive roller 4 and guide roller 5 be maintained sufficiently low to avoid deforming of the cake or its sliding over the paper, resulting in cakes of varying dimensions due to excessive demands on the extruding cake in overcoming said tension. The proper tension in this portion of the paper is maintained by actuating the drive roller 4 at a slightly greater peripheral velocity than that of the paper passing therefrom. Thus there is a small but regulated degree of slippage between the drive roller and the paper thereon. This is accomplished by a belt drive (not shown) from the conveyor head roller 6 and by a tightening roller 7. Following the course of the paper it passes from a supply roll 8, and over tightening roller 9, metering roller 10, tightening roller 7, drive roller 4, guide roller 5, and onto the shelf 2.

As will be apparent from this specification, it is imperative that there be substantially no slippage between the metering roller and the paper thereon, which condition is assured by maintaining the proper arc of contact and traction of the paper thereon by means of tightening rollers 7 and 9 and tension clamps 11. As its name signifies, the metering roller also contains a measuring device comprising a peripheral cam 12 having a 180 degree-spaced dual rise 13, a cam roll 14 having a follower 15 secured thereto and being held against the periphery of the cam by means of a tie rod 16 pivotally attached to the follower and connecting the metering roller with a single revolution friction clutch 17. Said clutch comprises a peripheral cam 18 having a single rise 19, a follower 20 pivotally attached to the opposite end of said tie rod and held against the periphery of said cam by means of a spring 21 secured to said follower.

The clutch 17 is attached to and driven by a rotatable shaft 22 which is actuated by belt drives 23 and 24 from the head drive shaft 25 which also drives the extruding machine and the conveyor head roller 6. The clutch is adjacent to the free end of the cutter wheel drive shaft 26. (Means through which power is transmitted from the head drive shaft to the extruding machine and conveyor head roller is not shown.)

Figure 2:
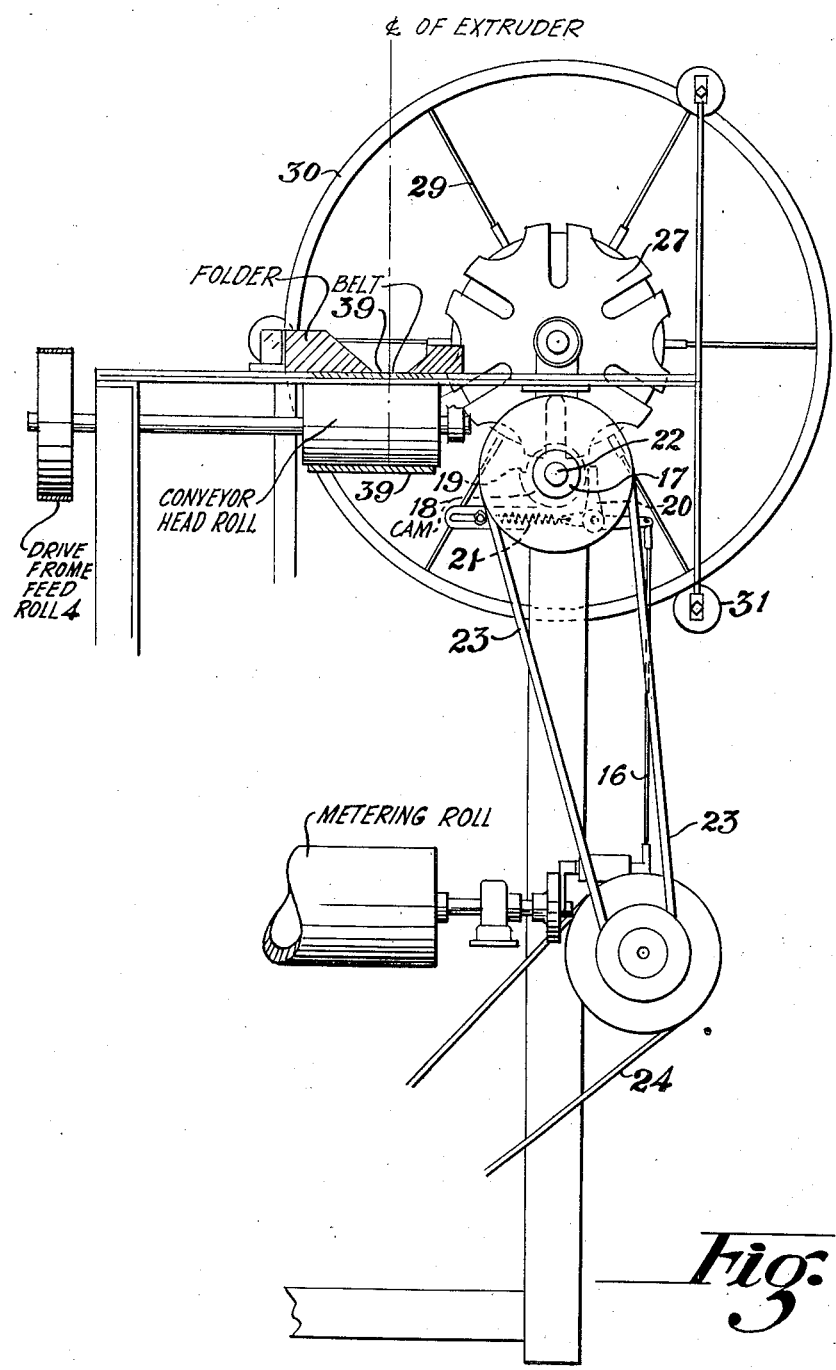
Figure 2 is a detailed side view, looking from the right, of the cutter wheel which also shows the arrangement of the single revolution clutch.

The cutter wheel 27 comprises a rotatable shaft 28 to which it is fixed, any suitable number of cutter elements 29, for example, six, attached to the hub of the wheel and extending therefrom to the rim 30 thereof to which their opposite ends are secured, and means 31 for guiding the rotation of said wheel. For a more detailed analysis of this wheel, reference is made to Figure 3 in which is shown the driver 32 and its tooth 33, said cutter wheel shaft 26 being concentrically journaled in the driver, a follower 34 having a series of grooves 35 and slots 36 therein, the grooves being adapted to receive the driver and the slots to receive the tooth. Figure 3 depicts a cutter wheel in which blades are used for cutters instead of the wire-like spokes of Figure 2. These knife-like cutter blades are especially desirable for cutting material which offers great resistance to being cut, for example, hard or large cakes.

In operation, as the cake is extruded onto the paper lying on the shelf 2, it pushes the paper along with it; thus the paper and cake travel at the same speed. The extrusion increases the tension in the paper between rollers 5 and 4, thereby producing greater traction on roller 4 and enabling it to drive the paper off the other rollers. Each time the cake carries the paper across the shelf a predetermined distance, it unwinds paper from the metering roller and rotates it through an angle of 180 degrees. At this stage one of the rises 13 in the metering roller cam 12 pushes out the cam roll 14 and the follower 15 which pulls down the tie rod 16. Since the apparatus is so arranged that for every one-half revolution of the metering roller there is one revolution of the clutch 17, at the position above described, the rise 19 of the clutch cam is resting on top of the clutch cam follower 20. The downward pull on the tie rod by the metering device moves the clutch cam follower away from its cam, thus engaging the clutch with the cutter wheel drive shaft 26 which actuates the cutter wheel driver 32 causing said wheel to rotate one-sixth of a revolution and one of the cutter elements 29 to pass through the extruding material and paper and through an opening 37 in the shelf, thereby severing the extruding material into segments of a predetermined length irrespective of variations in the rate of extrusion.

As soon as the cutter wheel has rotated one-sixth of a revolution, that is, after one of the cutter elements has cut a parcel of predetermined length from the extruding material, the clutch disengages the cutter wheel drive shaft 26 and the driver 32 passes into one of the grooves 35 and locks the cutter wheel. In the meantime, the extrusion is continuing and the metering roller is passing through the remainder of its revolution and bringing the other rise on its cam 12 in a position to push out the cam follower 15 again, pull down the tie rod 16, and push out the clutch follower 20, thereby causing the clutch to reengage the shaft 26 and causing one of the other cutter elements, which was brought to rest in a plane immediately above the extruding material by said previous rotation of the cutter wheel, to pass in the same path of its predecessor and cut another parcel of predetermined length from the extruding material after it has been projected a predetermined distance. This cycle repeats itself throughout the operation.

After being cut, the cakes are carried away from the cutter and through a wrapping device 38 by means of a conveyor belt 39.

An outstanding advantage of this invention resides in the fact that it provides an efficient means of cutting plastic material into parcels of any desired predetermined length irrespective of variations in the rate of extrusion. The importance of this feature will be appreciated more fully when considered in connection with the fact that even under standard conditions plastic materials, due to their different degree of plasticity, extrude at different rates. Under varying conditions, as to temperature for example, the rate of extrusion of the same plastic varies widely. Obviously, it would be highly impractical, if not impossible, to manually readjust the speed of the extruder to that of the cutter or vice versa each time a change of condition varied the rate of extrusion. Another advantage of the present invention is that the shelf over which the extruded material passes remains free of particles from said material, since it pushes the wrapping paper along with it and therefore never contacts the shelf. This prevents a film of the material from forming on the shelf and obstructing the extrusion path. If such a film were allowed to form on the shelf, it would cause the extruding cake to buckle up and become deformed generally, thereby producing cakes of various lengths and shapes.

The present invention is susceptible of many variations within the purview thereof. For instance, by proper variation of the cutter wheel and/or the measuring device, the apparatus may be adjusted to cut the extruded material into pieces of any desired predetermined length irrespective of variations in the rate of extrusion. Likewise, the apparatus may be adjusted to form pieces of any desired size from the extruded material. Furthermore, material other than paper may be used as a wrapping, or if it is desired not to wrap the extruded material, any suitable sheet material may be employed. Likewise, the cutter elements may extend radially from the hub of the cutter wheel or they may be off-centered in regard thereto.

While this invention may be applied to commercial gelatinous explosives, such as gelatin dynamite for example, its preferred application is to military demolition explosives wherein a solid explosive composition has been plasticized to a desired degree with a suitable plasticizing agent, such as for instance a wax, oil or similar compound. As examples of explosives for use trinitrotoluene, pentaerythritol tetranitrate, cyclotrimethylenetrinitramine, ethylene dinitramine and various blends of said compounds with one another may be cited.

As many apparently widely different embodiments of this invention may be made without departing from the spirit and scope thereof, it is to be understood that the invention is not limited to the specific embodiments thereof except as defined in the appended claims.

I claim:

1. An apparatus for forming extruded plastic material into pieces of predetermined dimensions which comprises in combination an extrusion nozzle, a supporting shelf adjacent to said nozzle and positioned to receive the material projected therefrom, a set of cooperating rollers so arranged as to allow a sheet material to be moved thereover and over said shelf only when and at the same rate the extruded material travels, thereby aiding the rotation of said rollers, a measuring device attached to one of said rollers, a cutting mechanism, means connecting the measuring device and cutting mechanism so that each time said measuring device rotates through a given angle it actuates the cutting mechanism and thereby completely severs a predetermined length from the extruded material superposed on the sheet material on said shelf.

2. An apparatus for forming extruded plastic material into pieces of predetermined dimensions which comprises in combination a set of cooperating rollers, a sheet material passing over the rollers and onto a supporting shelf, an extrusion nozzle adjacent to said shelf and positioned to extrude the plastic over the shelf in such manner as to cause said sheet to travel thereover only when and at the same rate the plastic travels, thereby aiding the rotation of said rollers, a measuring device attached to one of said rollers, a cutting mechanism, means connecting the measuring device and cutting mechanism so that each time the extruded material projects across the shelf a predetermined distance it aids in rotating the measuring device through a given angle causing it to actuate the cutting mechanism and thereby completely sever a piece of predetermined dimensions from the extruded material.

3. The apparatus of claim 2 in which said sheet material comprises wrapping paper.

4. An apparatus for cutting extruded plastic explosives into pieces of a predetermined length which comprises in combination a set of cooperating rollers, wrapping material in sheet form passing over the rollers and onto a supporting shelf, an extrusion nozzle adjacent to said shelf and positioned to extrude the explosive over the shelf in such manner as to cause said sheet to travel thereover and over said rollers only when and at the same rate the explosive travels, thereby aiding the rotation of the rollers, said rollers being so positioned as to maintain the proper traction of the sheet thereon, a measuring device attached to one of said rollers, means for preventing slippage between said sheet and the measuring device, a cutting mechanism, a tie rod connecting the measuring device and cutting mechanism so that each time the explosive projects across the shelf a predetermined distance it aids in rotating the measuring device through a given angle causing it to actuate the cutting mechanism and thereby completely cut a piece of predetermined length from the extruded explosive, and means for removing the sized pieces from the cutting position.

5. An apparatus for cutting extruded plastic material into pieces of a predetermined length irrespective of variations in the rate of extrusion which comprises in combination an extruding means, a supporting shelf adjacent to said means and positioned to receive the material projected therefrom, a plurality of cooperating rollers adapted to allow a sheet material to be moved thereover and over said shelf by the extruded material only when and at the same rate the extruded material travels, thereby aiding the rotation of said rollers, a measuring device attached to one of the rollers in fixed relationship therewith, a cutting mechanism mounted in cutting position with respect to said shelf, means connecting the measuring device and cutting mechanism so that each time the extruded material projects across the shelf a predetermined distance it aids in rotating the roller to which the measuring device is attached through a given angle causing said measuring device to actuate the cutting mechanism and thereby completely cut crosswise the extruded material and thus form a piece of predetermined length therefrom.

6. The apparatus of claim 5 in which two tightener rollers are employed to increase the arc of contact of said sheet material on said other rollers.

7. The apparatus of claim 5 in which said rollers comprise a drive roller, a supply roll and a metering roller including a measuring device securely attached thereto and in fixed relationship therewith, said metering roller having clamps impinging upon its periphery and preventing slippage between the roller and said sheet material thereon.

8. The apparatus of claim 5 in which said measuring device comprises a peripheral cam, a cam roll having a follower secured thereto and being held against the periphery of the cam by means of a tie rod pivotally attached to said follower.

9. The apparatus of claim 5 in which the means connecting the measuring device with the cutting mechanism includes a clutch comprising a peripheral cam, a follower pivotally attached to a tie rod from said measuring device and held against the periphery of the cam by means of a spring attached to the follower, said clutch being fixed to a rotatable shaft and adjacent to the drive shaft of the cutting mechanism so as to alternately engage and disengage said drive shaft and thus impart a specific motion to said cutting mechanism each time the extruded material projects across the shelf a predetermined distance.

10. The apparatus of claim 5 in which the cutting mechanism comprises a wheel embodying the Geneva movement and including a plurality of wire-like cutter spokes attached to the hub thereof and extending therefrom to the rim of said wheel to which their opposite ends are secured, and means for guiding the rotation of the wheel.

11. The apparatus of claim 5 in which the cutting mechanism comprises a rimless wheel embodying the Geneva movement and including a supporting shaft concentrically journaled therein, a drive shaft concentrically secured to the eccentric driver of said wheel, and a plurality of knife-like blades attached to the hub of said wheel and projecting therefrom.

WILLIAM S. PILCHER.